(12) United States Patent
Fukumoto et al.

(10) Patent No.: US 6,621,065 B1
(45) Date of Patent: Sep. 16, 2003

(54) IMAGING PROBE

(75) Inventors: Yasushi Fukumoto, Kawasaki (JP);
Seiji Shimokawa, Kawasaki (JP);
Kenji Okabe, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 371 days.

(21) Appl. No.: 09/708,535

(22) Filed: Nov. 9, 2000

(30) Foreign Application Priority Data

Nov. 30, 1999  (JP) .......................................... 11-340331

(51) Int. Cl.$^7$ ................................................ H01J 40/14
(52) U.S. Cl. ....................... 250/216; 250/239; 250/306; 359/368
(58) Field of Search ................................. 250/216, 239, 250/559.07, 559.08, 208.1, 306, 307; 359/368, 381, 382, 385, 388

(56) References Cited

U.S. PATENT DOCUMENTS

| | | | |
|---|---|---|---|
| 4,882,527 A | * 11/1989 | Yakuyama et al. | .... 318/568.13 |
| 4,914,293 A | * 4/1990 | Hayashi et al. | ............. 250/306 |
| 5,239,178 A | 8/1993 | Derndinger et al. | |
| 5,315,374 A | 5/1994 | Yoshizumi | |
| 6,392,795 B2 | * 5/2002 | Okada | .......................... 359/368 |

FOREIGN PATENT DOCUMENTS

| | | |
|---|---|---|
| JP | 04-336444 | 11/1992 |
| JP | 05-157554 | 6/1993 |
| JP | 05-173078 | 7/1993 |
| JP | B2 2634700 | 4/1997 |

* cited by examiner

*Primary Examiner*—Kevin Pyo
(74) *Attorney, Agent, or Firm*—Oliff & Berridge, PLC

(57) ABSTRACT

A CCD camera (27) images a work to generate its image data. An imaging optical system (24, 25, 26) focuses an image of the work on the CCD camera (27). A down-projection illumination source (31) includes at least one semiconductor light-emitting device for producing a down-projection illumination light to illuminate the work from above. An illuminating optical system (29) joins the illumination light from the down-projection illumination source (31) to the imaging optical system in order to lead the illumination light to the work via the imaging optical system. These optical components are mounted on a chassis (23) to construct an imaging probe (1), which is employed at any angle as a measuring probe of a three-dimensional tester.

16 Claims, 7 Drawing Sheets

IMAGING PROBE

BACKGROUND OF THE INVENTION

1. Field of the Invention

The present invention relates to an imaging probe for use in an image tester that measures a surface feature based on image data generated when a work is imaged. More particularly, it relates to an imaging probe employed as a measuring probe of a three-dimensional tester so that the three-dimensional tester can serve as the image tester.

2. Description of the Related Art

An image tester employs a CCD camera to take an image of a work directly or through the use of a microscope that magnifies the image. Then, through an image processing and arithmetic processing performed to the image data obtained, it measures dimensions of parts of the work. Such the image tester has a disadvantage because the quality of a light source for illuminating the work varies qualities of the collected image data, such as clearness, and exerts an influence on measurement precision. Therefore, the light source for illuminating the work is required to emit an illuminating light with such directivity and uniformity that allow characteristics of the work to be taken with fidelity.

Currently known illuminations for use in the image tester include a down-projection illumination, which provides a light on a work via an imaging optical system, and a ring illumination, which provides a light around a work from the surrounding of an imaging optical system. The image tester often employs these illuminations together. In each of these illuminations, a halogen lamp is conventionally used for a light source.

In order to use a three-dimensional tester as the image tester, an imaging probe has been employed as a measuring probe of the three-dimensional tester in the art. Most conventional imaging probes are secured on the Z-axis (vertical axis) and therefore can not be changed easily with other probes such as a touch signal probe. Because the imaging probe that employs a halogen lamp as the light source has a relatively larger size. In addition, an optical fiber may be employed for leading a light to the proximity of the work from a light source in order to avoid thermal influence from the light source. Accordingly, the size of and thermal radiation from the light source, as well as a path for introducing the illuminating light, raises a problem on realizing an imaging probe easily detachable.

A mechanism for swaying the imaging probe is further required to allow a sample to be imaged at any given angle. It is difficult to sway the imaging probe, however, because of a problem on a load-carrying capacity of the swaying mechanism in addition to the above problems on illumination (the light source and the light introducing path). Thus, it is hard to realize an imaging probe that can satisfy conditions including a possibility of changing a probe (easy detachability) and of setting any imaging direction.

SUMMARY OF THE INVENTION

The present invention has been made in consideration of the above problems and accordingly has an object to provide an imaging probe with a small size, light weight, easy detachability and desirably adjustable imaging direction.

The present invention is directed to an imaging probe attachable to a three-dimensional tester as a measuring probe thereof. The imaging probe comprises a solid state imaging device for imaging a work to generate image data thereof; an imaging optical system for focusing an image of the work on the solid state imaging device; a down-projection illumination source, including at least one semiconductor light-emitting device, for producing a down-projection illumination light to illuminate the work; an illuminating optical system for joining the illumination light from the down-projection illumination source to the imaging optical system in order to lead the illumination light to the work via the imaging optical system; a chassis for supporting the solid state imaging device, imaging optical system, down-projection illumination source and illuminating optical system while retaining a certain positional relation among them; and a housing for accommodating the solid state imaging device, imaging optical system, down-projection illumination source and illuminating optical system supported on the chassis.

In the imaging probe according to the present invention, the solid state imaging device, imaging optical system, down-projection illumination source and illuminating optical system are supported on a chassis and accommodated in a housing while retaining a certain positional relation among them. In particular, the down-projection illumination source consists of the semiconductor light-emitting device(s). Therefore, the light source can be made to have a lighter weight and extremely less heating value than that of the use of a halogen lamp. Thus, the down-projection illumination source can be located in the proximity of other members without any large problem. This reduction of a space for arranging components leads to realization of a small and light imaging probe.

The imaging optical system may include an object lens opposing to the work and a focusing lens for focusing a light reflected from the work and transmitted through the object lens on the solid state imaging device. A half mirror may be located in oblique to the optical axis of the imaging optical system between the object lens and the focusing lens. The illumination light emitted from the down-projection illumination source is led into and reflected at the half mirror to illuminate the work via the object lens.

The imaging probe according to the present invention can be detachably mounted, for example, on a probe head of the three-dimensional tester via a mounting block or shank block. The mounting block may be provided with a connector function for electrically connecting and disconnecting input/output signals and power supplies to the down-projection illumination source and solid state imaging device through attachment to and detachment from the probe head. If the imaging probe is mounted on the probe head via the shank block, the shank block may include a connector for connecting with input/output signals and power supplies to the down-projection illumination source and solid state imaging device independently of the shank block.

In a preferred embodiment of the present invention, the imaging probe may further comprise a ring illumination source, which includes semiconductor light-emitting devices arranged to surround the imaging optical system, for producing a ringed illumination light to illuminate the work from the surrounding of the imaging optical system. In this case, the down-projection illumination source and ring illumination light source are activated selectively or simultaneously. Preferably, the down and/or ring illumination light source may be turned on only when the solid state imaging device is operative to image. Preferably, the illumination light from the down and/or ring illumination light source may be illuminated on the work via a diffusing plate. The down and/or ring illumination source may comprise a plurality of semiconductor light-emitting devices. In this case, the plurality of semiconductor light-emitting devices may be controlled simultaneously, or on a block-by-block basis, or independently to turn on/off or vary brightness. The down and/or ring illumination source may be packaged in a cartridge.

Desirably, the chassis and/or housing may be composed of a magnesium alloy that is light and has a high thermal radiation effect. Preferably, the imaging probe of the present invention may have a weight of 500 grams or less.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which.

DETAILED DESCRIPTION OF THE PREFERRED EMBODIMENTS

Figure 1A:
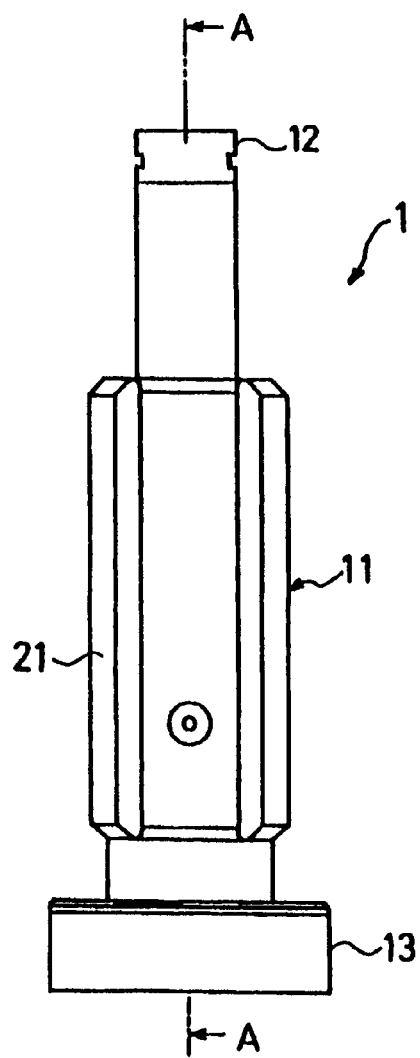
FIGS. 1A and 1B are front and side views illustrating an appearance of an imaging probe according to one embodiment of the present invention.
Figure 1B:
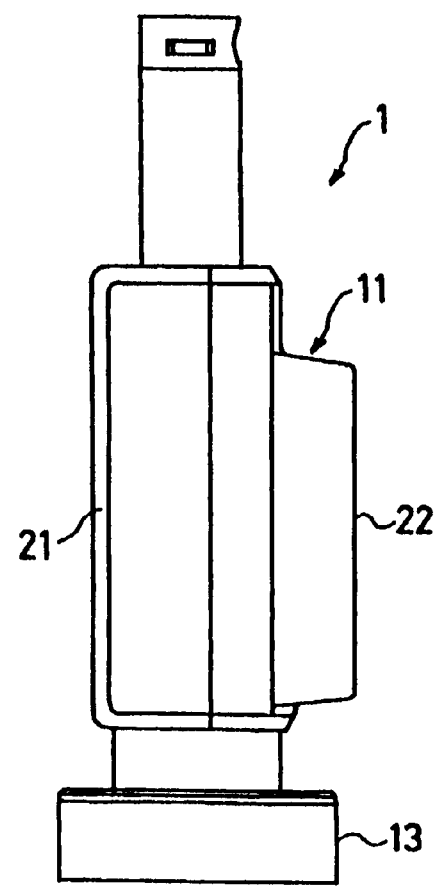
Figure 2:
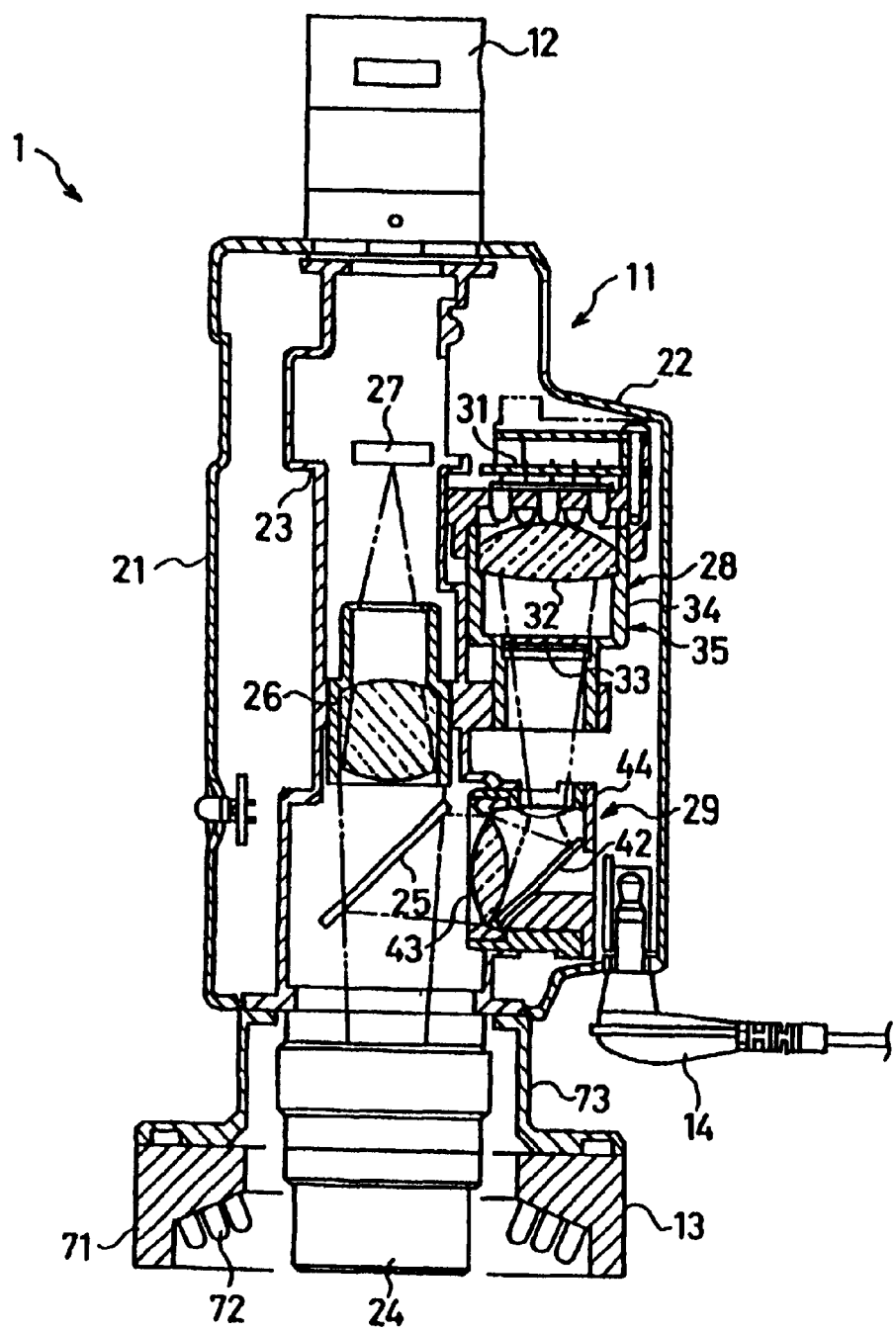
FIG. 2 is a cross-sectional view of the imaging probe taken along the A—A line in FIG. 1A.

Preferred embodiments of the present invention will now be described below with reference to the accompanying drawings. FIG. 1A is a front view illustrating an appearance of an imaging probe 1 according to one embodiment of the present invention and FIG. 1B is a side view thereof. FIG. 2 is a cross-sectional view taken along the A—A line in FIG. 1A.

The imaging probe 1 comprises a housing 11, a mounting block 12 and a ring illumination source 13. The housing 11 accommodates the probe body that includes such optical components as described later. The mounting block 12 is provided on the upper end portion of the housing 11 and is detachably mounted on a probe head of a three-dimensional tester not depicted. The ring illumination source 13 is attached to the lower end portion of the housing 11.

The housing 11 includes a front cover 21 and rear cover 22, which form a cylindrical space. This cylindrical space accommodates a chassis 23 that extends vertically. Various optical components and others are secured on this chassis 23 while retaining a certain positional relation among them. An object lens 24 is located at the lower end portion of the chassis 23, opposing to a work not depicted. A focusing lens 26 is spaced upwardly from the object lens 24 by a given distance. A CCD camera 27 is disposed on a much higher location. The object lens 24 and focusing lens 26 have a coaxial optical axis to configure an imaging optical system. A light reflected from the work and transmitted through the object lens 24 is condensed through the focusing lens 26 and focused on the photoreceptive surface of the CCD camera (solid state imaging device) 27. A half mirror 25 is arranged in oblique to the optical axis between the object lens 24 and focusing lens 26 in this imaging optical system. The half mirror 25 is employed to join a light for illuminating the work into the imaging optical system as described later.

A down-projection illumination unit 28 is provided at a rear position of the CCD camera 27 to emit an illumination light downwardly. The down-projection illumination unit 28 comprises a down-projection illumination source 31, which consists of a plurality of semiconductor light-emitting devices, and an illumination light source unit 35. The latter includes a condenser 32 attached to the side of the outlet for the illumination light from the down-projection illumination source 31, a diffusing plate 33 and a cylindrical body 34.

The illumination light emitted from the down-projection illumination unit 28 is introduced into a coupling optical unit 29. The coupling optical unit 29 comprises a mirror 42, which converts the advancing direction of the diffused illumination light from the illumination light source unit 35 into the horizontal direction. It also comprises a lens 43, which condenses the illumination light transmitted through the mirror 42, and a cylindrical body 44, which holds the mirror 42 and lens 43. The illumination light, of which advancing direction was converted into the horizontal direction at the coupling optical unit 29, is led into the half mirror 25 in the imaging optical system. The illumination light changes its advancing direction downwardly when it is reflected at the half mirror 25 and then illuminates the work through the object lens 24. The illumination light source unit 35 and coupling optical unit 29 configure an illuminating optical system.

Figure 3:
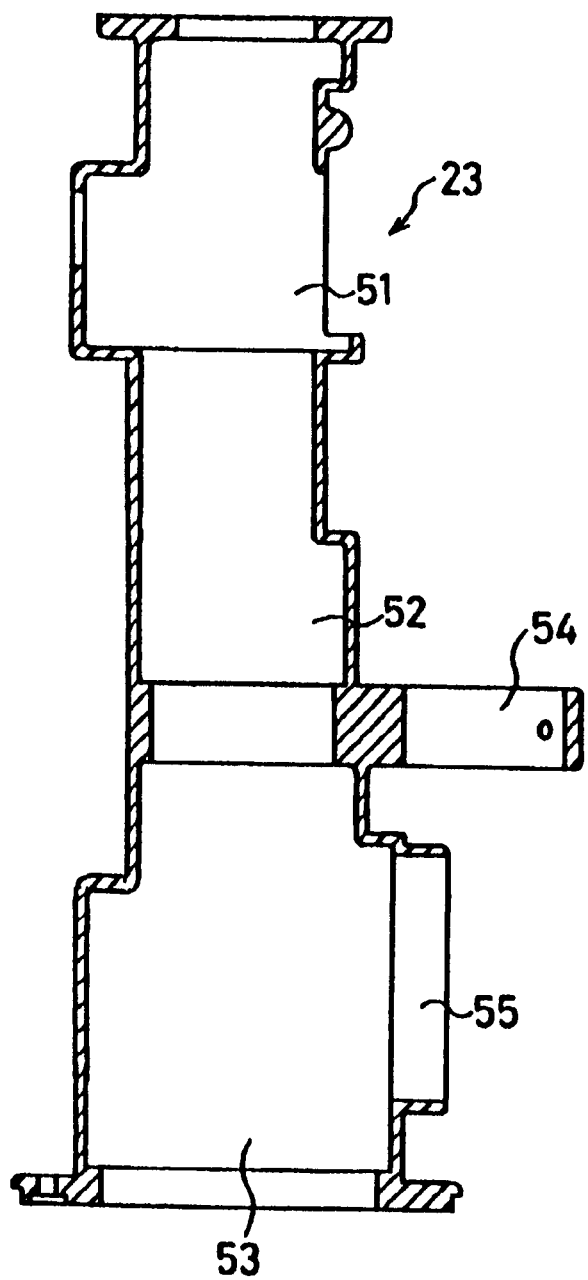
FIG. 3 is a cross-sectional view of a chassis for use in the imaging probe.

FIG. 3 is a cross-sectional side view of the chassis 23. The chassis 23 forms a space that extends vertically to accommodate the imaging optical system. This space is divided vertically into three sections each employed as a containing part. The uppermost section 51 is for the CCD camera 27, the middle section 52 for the focusing lens 26 and the lowermost section 53 for the half mirror 25. At the rear of a location between the sections 52 and 53, an annular support 54 is provided protruding to support the down illumination unit 28. At the rear of the section 53, an opening 55 is formed to allow the coupling optical unit 29 to couple thereto.

Figure 4A:
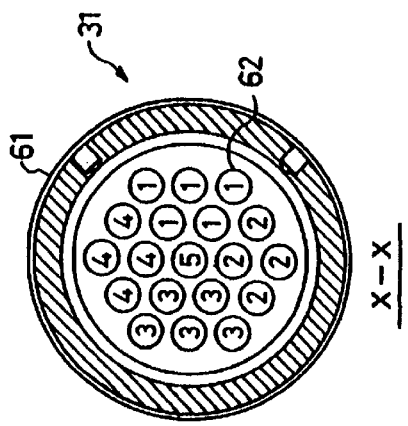
FIGS. 4A–4D illustrate a down-projection illumination source for use in the imaging probe.
Figure 4B:
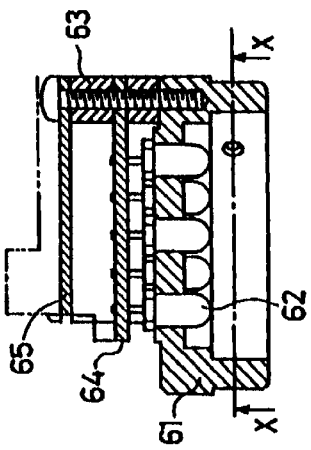
Figure 4C:
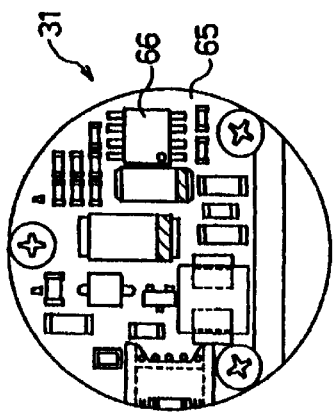
Figure 4D:
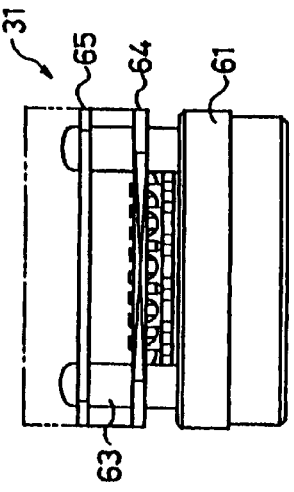

FIGS. 4A–4D illustrate the down-projection illumination source 31 in detail: FIG. 4A is a plan view seen from below; FIG. 4B a cross-sectional side view; FIG. 4C a plan view seen from above; and FIG. 4D a side view.

As shown in the figures, the down-projection illumination source 31 includes a plurality of LEDs (light emitting diodes) 62 or semiconductor light-emitting devices, which are arranged two-dimensionally on the bottom of a disc-shaped frame 61 that has an edge extending downwardly. The rear or the upper surface of the frame 61 supports two disc-shaped printed wiring boards 64, 65 via poles 63. The board 64 includes the LEDs 62 mounted thereon, and the board 65 includes electric components 66 mounted thereon to configure a driver for the LEDs 62. The plural LEDs 62 are divided into five groups as shown in FIG. 4A. The numeral, marked inside each graphic that illustrates an LED 62, indicates the group number. The LEDs 62 can be controlled separately on a group-by-group basis.

Figure 5A:
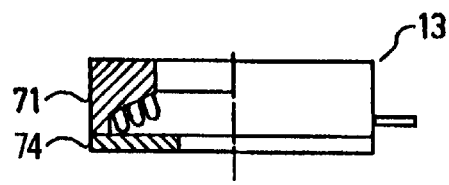
FIGS. 5A and 5B are a partly cross-sectioned side view and lower plan view illustrating a ring illumination source for use in the imaging probe.
Figure 5B:
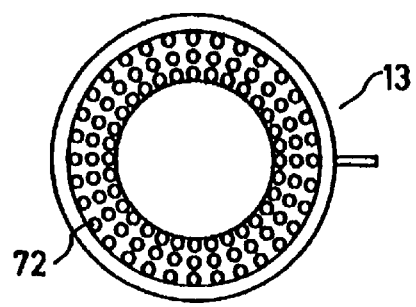

FIGS. 5A and 5B are a partly cross-sectioned side view and a plan view seen from below, for illustrating the ring illumination source 13. The ring illumination source 13 includes an annular frame 71 that has an edge extending downwardly and inner bottom tapered inwardly, and a plurality of LEDs 72 that comprise semiconductor light-emitting devices located on the inner bottom of the frame 71, which are packaged in a cartridge. The ring illumination source 13 surrounds the object lens 24 as shown in FIG. 2. The rear surface of the light source 13 is detachably attached on the lower surface of the chassis 23 via a cylindrical attachment 73 to illuminate the work from the surrounding of the object lens 24 with an appropriate illumination range and operation distance. The attachment 73 may include a known telescopic mechanism for use in a zoom lens in order to move the ring illumination source 13 manually or automatically to an optimal position for illuminating the work. A diffusing plate 74 is provided at the front of the ring illumination source 13 to illuminate the work with a uniform illumination light.

In the imaging probe 1 thus configured, the illumination light from the down-projection illumination source 31 is converted through the diffusing plate 33 into the one with a uniform brightness. It is then led into the imaging optical system via the coupling optical system 29 to illuminate the work through the object lens 24 as a vertical, down illumination light. An image of the work taken by the CCD camera 27 and output to external as image data via a connector in the mounting block 12.

The illumination source unit 35 of the down-projection illumination unit 28 is contained in a cartridge and is therefore integrally attachable and changeable. For example, if the down-projection illumination unit 28 is slidable downwardly relative to the support 54 of the chassis 23, the illumination source unit 35 can be detached easily. In addition, the down-projection illumination unit 28 itself has a structure tightly attachable to the chassis 23 and can conduct the heat radiated from the light source to the chassis 23 efficiently. Therefore, the chassis 23 and covers 21, 22 are desired to employ a magnesium alloy that has a higher thermal radiating effect than that of a plastic. The magnesium alloy can be molded through a thixotropic molding method. Table 1 shows properties of the magnesium alloy and other typical materials for die-casting.

TABLE 1

|  | Magnesium alloy | Aluminum Alloy | Zinc alloy |
| --- | --- | --- | --- |
| Specific gravity | 1.81 | 2.68 | 6.6 |
| Tensile strength (Mpa) | 240 | 331 | 283 |
| Thermal conductivity (W/m*k) | 51 | 96 | 113 |

The magnesium alloy can be thinned to 0.6–1.2 mm and has a property for shielding electromagnetic waves as such. It has a higher thermal conductivity than that of a plastic. Production of the chassis 23 and covers 21, 22 from the magnesium alloy can reduce a total weight of the imaging probe 1 as light as 500 grams or less (400 grams or less if it can be further thinned). It can also increase the electromagnetic shield and thermal radiation properties at the same time.

Figure 6:
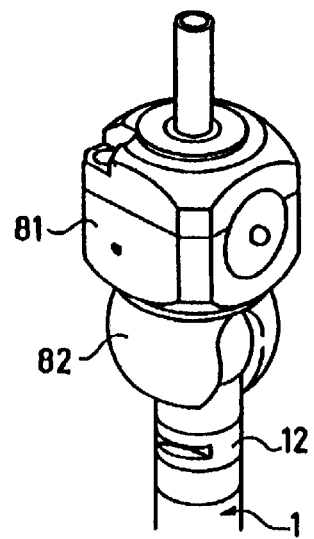
FIG. 6 is a perspective view showing a probe head for receiving the imaging probe mounted thereon.

According to the present embodiment, the imaging probe 1 is light and, as shown in FIG. 6, it can be mounted on the tip of a rotary joint 82 located at the top of a probe head 81 of a three-dimensional tester via the mounting block 12. The mounting block 12 has a function for holding the imaging probe 1. It also has a connector function for electrically connecting the CCD camera and illumination light sources (supplying powers and transferring video signals). When the imaging probe 1 is supported on the probe head 81 via the mounting block 12, it is provided with a rotation and obliquity at any angle. The probe head 81 is supported on the Z-axis of the three-dimensional tester, for example. Therefore, attachment and detachment of the imaging probe 1 to and from the probe head 81 can achieve electrical connections and disconnections between both simultaneously. If the ring illumination source 13 is additionally employed, a supply voltage for the ring illumination source 13 may be supplied through the connector 14 as shown in FIG. 2.

Figure 7:
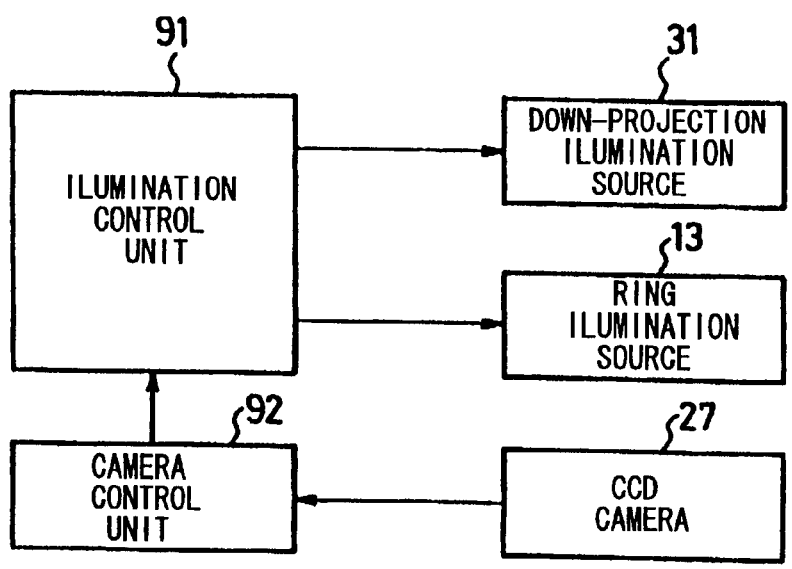
FIG. 7 is a block diagram showing a controller for the imaging probe.

Two illumination light sources in the imaging probe 1, the down-projection illumination and ring illumination sources 31 and 13, are independently dimmed by an illumination control unit 91 as shown in FIG. 7. The illumination control unit 91 determines and controls to turn on/off either one or both of the down-projection and ring illumination sources 31 and 13. It also determines and controls to turn on/off and dim the LEDs 62 and 72 contained in the illumination light sources all at once or separately or on a block-by-block basis. For example, it controls the down illumination light source 31, which is divided into five blocks as shown in FIG. 4, to turn on/off and adjust brightness on a block-by-block basis.

The semiconductor light-emitting devices for use in the down-projection and ring illumination sources 31 and 13 may employ LDs (laser diodes) rather than LEDs. The semiconductor light-emitting devices can be selected to emit lights with any single and identical color such as red, green and white or with a combination of these colors. A light with a color appropriate to the work may be selected when a plurality of lights with different colors can be emitted.

As shown in FIG. 7, the CCD camera 27 is under control of a camera control unit 92. When the illumination control unit 91 receives an imaging signal from the camera control unit 92, it controls the illumination sources 31 and 13 to turn on only at the time of imaging, thereby suppressing heating values radiated from the illumination sources 31 and 13. The illumination and camera control units 91 and 92 can be controlled from a three-dimensional controller not depicted.

Figures 8A, 8B:
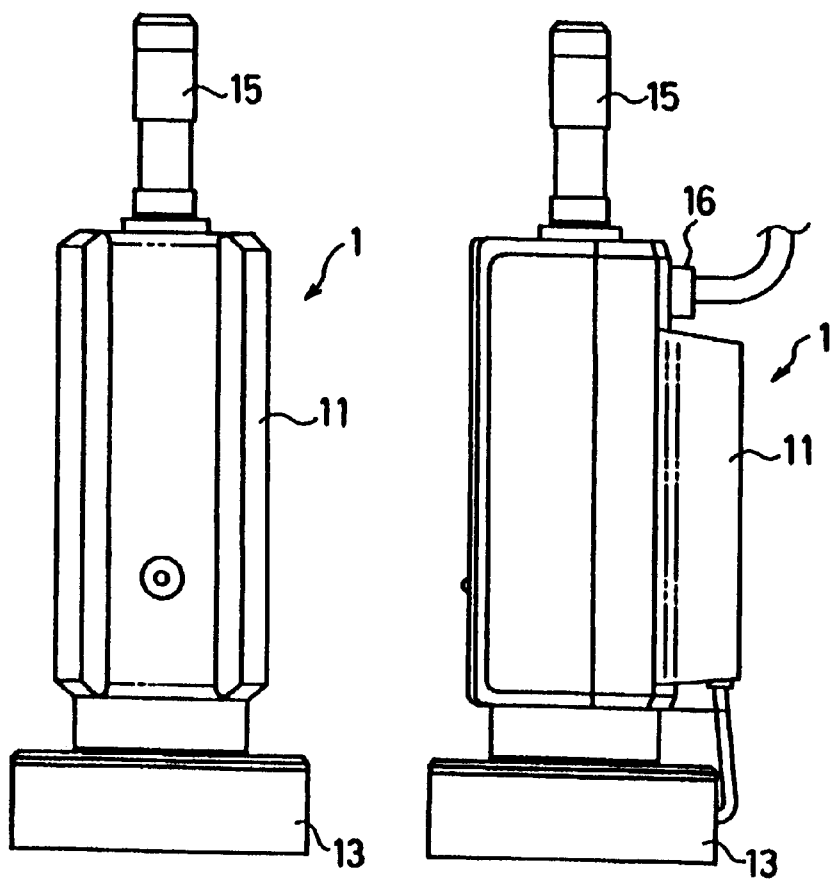
FIGS. 8A and 8B are front and side views illustrating an appearance of an imaging probe according to another embodiment of the present invention.

The mounting block 12 can be automatically attached and detached by the probe head 81 (automatic probe changing). If this automatic attachment/detachment function is not employed, a shank block 15 may be provided as shown in FIG. 8, instead of the mounting block 12. When the shank block 15 is provided, the imaging signal from the CCD camera 27 as well as the power supplies and others for the illumination light sources 31 and 13 may be input and output through another connector 16. In this case, after the shank block 15 of the imaging probe 1 is manually attached onto the Z-axis of the three-dimensional tester, the connector 16 is coupled to connect various electrical signals. These operations can be performed with a single action, which achieves excellent attachment/detachment operation-ability.

As obvious from the forgoing, the present imaging probe can effect the followings:

(1) It can realize a small and light imaging probe, which is changeable automatically with the same operability as that of the conventional touch-probe, and which can be employed in the three-dimensional tester and the like to measure in contact or non-contact mode successively and automatically.

(2) It can be attached to the probe head with the same operability as that of the conventional touch-probe.

accordingly, the imaging probe can be easily operated at any rotational angle and any oblique angle. This enables the work to be measured from any orientation and with an extremely improved flexibility.

(3) In addition to these effects, the down and ring illumination light sources can be switched optionally. Therefore, a high quality image can be taken to improve measurement accuracy.

(4) The illumination light source is necessarily turned on only at the time of imaging. This can suppress heat radiation, which may degrade accuracy of the imaging system, and can improve measurement accuracy.

(5) The illumination light source comprises a plurality of semiconductor light-emitting devices, which can be controlled to turn on/off and adjust brightness independently or on a group-by-group basis. Accordingly, an illumination can be performed in any direction in order to take a high quality image.

(6) The illumination light source is possibly integrated (contained in a cartridge). Thus, easy maintenance and changing operations can be realized.

(7) The chassis and covers can be composed of a magnesium alloy. This leads to a changeable imaging probe with a weight of 500 grams or leas, which can be employed in measurement with the same operability as that of the conventional touch probe.

As obvious from the forgoing, the down illumination light source according to the present invention consists of the semiconductor light-emitting device(s). Therefore, the light source can be made to have a lighter weight and extremely less heating value than that of the use of a halogen lamp. Thus, a reduced space for arranging components leads to realization of a small and light imaging probe.

Having described the embodiments consistent with the present invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. An imaging probe, comprising:
    a solid state imaging device for imaging a work to generate image data thereof;
    an imaging optical system for focusing an image of said work on said solid state imaging device;
    a down-projection illumination source, including at least one semiconductor light-emitting device, for producing a down-projection illumination light to illuminate said work;
    an illuminating optical system for joining said illumination light from said down-projection illumination source to said imaging optical system in order to lead said illumination light to said work via said imaging optical system;
    a chassis for supporting said solid state imaging device, imaging optical system, down-projection illumination source and illuminating optical system while retaining a certain positional relation among them;
    a housing for accommodating said solid state imaging device, imaging optical system, down-projection illumination source and illuminating optical system supported on said chassis; and
    a ring illumination source, including semiconductor light-emitting devices arranged to surround said imaging optical system, for producing a ringed illumination light to illuminate said work from the surrounding of said imaging optical system, wherein said down-projection illumination source and ring illumination source are activated selectively or simultaneously,
    whereby the imaging probe serves as a measuring probe attachable to a three-dimensional tester.

2. The imaging probe according to claim 1, wherein said imaging optical system includes:
    an object lens opposing to said work; and
    a focusing lens for focusing a light reflected from said work and transmitted through said object lens on said solid state imaging device,
    and wherein said illuminating optical system includes a half mirror located in oblique to the optical axis between said object lens and said focusing lens in said imaging optical system for reflecting said illumination light emitted from said down-projection illumination source and leading it to said work via said object lens.

3. The imaging probe according to claim 1, further comprising a mounting block for detachably mounting said imaging probe on a probe head of said three-dimensional tester, wherein said mounting block is provided with a connector function of electrical connection to and disconnection from said down-projection illumination source and solid state imaging device through attachment to and detachment from said probe head.

4. The imaging probe according to claim 1, further comprising:
    a shank block detachably mounted on a probe head of said three-dimensional tester; and
    a connector for electrically connecting to said down illumination light source and solid state imaging device.

5. The imaging probe according to claim 1, wherein said down-projection illumination source is turned on only when said solid state imaging device is operative to image.

6. The imaging probe according to claim 1, wherein said ring illumination source is turned on only when said solid state imaging device is operative to image.

7. The imaging probe according to claim 1, wherein said illumination light from said down-projection illumination source is illuminated on said work via a diffusing plate.

8. The imaging probe according to claim 1, wherein said illumination light from said ring illumination source is illuminated on said work via a diffusing plate.

9. The imaging probe according to claim 1, wherein said down-projection illumination source comprises a plurality of semiconductor light-emitting devices.

10. The imaging probe according to claim 1, wherein said ring illumination light source comprises a plurality of semiconductor light-emitting devices.

11. The imaging probe according to claim 9, wherein said plurality of semiconductor light-emitting devices are controlled simultaneously, or on a block-by-block basis, or independently to turn on/off and/or vary brightness.

12. The imaging probe according to claim 10, wherein said plurality of semiconductor light-emitting devices are controlled simultaneously, or on a block-by-block basis, or independently to turn on/off and/or vary brightness.

13. The imaging probe according to claim 1, wherein said down-projection:illumination source is packaged in a cartridge.

14. The imaging probe according to claim 1, wherein said ring illumination source is packaged in a cartridge.

15. The imaging probe according to claim 1, wherein said chassis and/or housing is composed of a magnesium alloy.

16. The imaging probe according to claim 1, wherein said imaging probe has a weight of 500 grams or less.

* * * * *